US012321620B2

(12) United States Patent
Bi

(10) Patent No.: US 12,321,620 B2
(45) Date of Patent: Jun. 3, 2025

(54) TECHNIQUES FOR MEMORY ZONE SIZE ADJUSTMENT

(71) Applicant: Micron Technology, Inc., Boise, ID (US)

(72) Inventor: Yanhua Bi, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 231 days.

(21) Appl. No.: 17/726,101

(22) Filed: Apr. 21, 2022

(65) Prior Publication Data

US 2023/0043338 A1 Feb. 9, 2023

Related U.S. Application Data

(60) Provisional application No. 63/230,498, filed on Aug. 6, 2021.

(51) Int. Cl.
*G06F 3/06* (2006.01)
(52) U.S. Cl.
CPC .......... *G06F 3/0631* (2013.01); *G06F 3/0604* (2013.01); *G06F 3/0679* (2013.01)
(58) Field of Classification Search
CPC ..... G06F 3/0631; G06F 3/0604; G06F 3/0679
See application file for complete search history.

(56) References Cited

U.S. PATENT DOCUMENTS

| | | | |
|---|---|---|---|
| 2015/0106556 A1* | 4/2015 | Yu ........................ | G06F 12/0246 711/103 |
| 2016/0259594 A1* | 9/2016 | Takahashi ............... | G06F 11/34 |
| 2020/0026436 A1* | 1/2020 | Ou ......................... | G06F 3/0611 |
| 2022/0035561 A1* | 2/2022 | Ha ......................... | G06F 3/0673 |
| 2023/0195342 A1* | 6/2023 | Kim ....................... | G06F 3/0679 711/154 |

\* cited by examiner

*Primary Examiner* — Eric T Loonan
(74) *Attorney, Agent, or Firm* — Holland & Hart LLP

(57) ABSTRACT

Methods, systems, and devices for techniques for memory zone size adjustment are described. A memory system may dynamically update the size of a stale zone configured to store data written during a write burst or write booster mode. The stale zone may be part of a first block of memory cells, and may retain data during a transfer operation, such as flush operation. The size of the stale zone may be updated in response to the memory system receiving a command, such as an unmap command. The size of the stale zone may be determined based on an available zone size, an amount of data indicated in the command, an amount of data indicated in the command that has been transferred to a second block of memory cells, or a combination thereof.

20 Claims, 6 Drawing Sheets

TECHNIQUES FOR MEMORY ZONE SIZE ADJUSTMENT

FIELD OF TECHNOLOGY

The present Application for Patent claims the benefit of U.S. Provisional Patent Application No. 63/230,498 by Bi, entitled "TECHNIQUES FOR MEMORY ZONE SIZE ADJUSTMENT," filed Aug. 6, 2021, assigned to the assignee hereof, and expressly incorporated by reference in its entirety herein.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

In some memory devices, background operations such as, for example, a flush operation may transfer data from one set of memory cells to a second set of memory cells (e.g., transfer data from a single-level cell (SLC) block to a tri-level cell (TLC) block). Some memory devices may include a set of memory cells configured to retain data during the flush operation. In some cases, the set of memory cells configured to retain data may be referred to as a stale zone. For example, the stale zone may be configured to store recent data received from the host during a write burst (WB) mode of operation. The recent data may, in some examples, include temporary data (i.e., temporary data that may subsequently be deleted). In some cases, the stale zone may have a static size, and recent data that exceeds the size of the stale zone may be stored in other portions of the SLC block. The excess data stored in the other portions of the SLC block may be transferred to the TLC block, and the memory device may use power resources to delete the transferred data, for example when the memory device receives a command (e.g., an unmap command) to remove the temporary data, which may reduce efficiency of the memory device and cause unneeded power consumption, among other disadvantages.

As described herein, a memory device may dynamically update a size of a zone, such as a stale zone, to accommodate recent data from a host device. The recent data may be written, for example, during a WB mode. In some examples, the memory device may, in response to receiving a command to remove at least a portion of the recent data (e.g., an unmap command), determine a size of data (e.g., a size of data to be removed indicated in the unmap command) and an amount of available space in an SLC block, and set the size of the stale zone to include the available space. In other embodiments, the memory device may determine the stale zone size based on additional parameters, such as one or more host data size thresholds (e.g., the amount of data to be removed in the SLC block). For example, the memory device may determine to set the stale zone size to the default zone size or to a size determined by a previous size of data to be removed.

Figure 1:
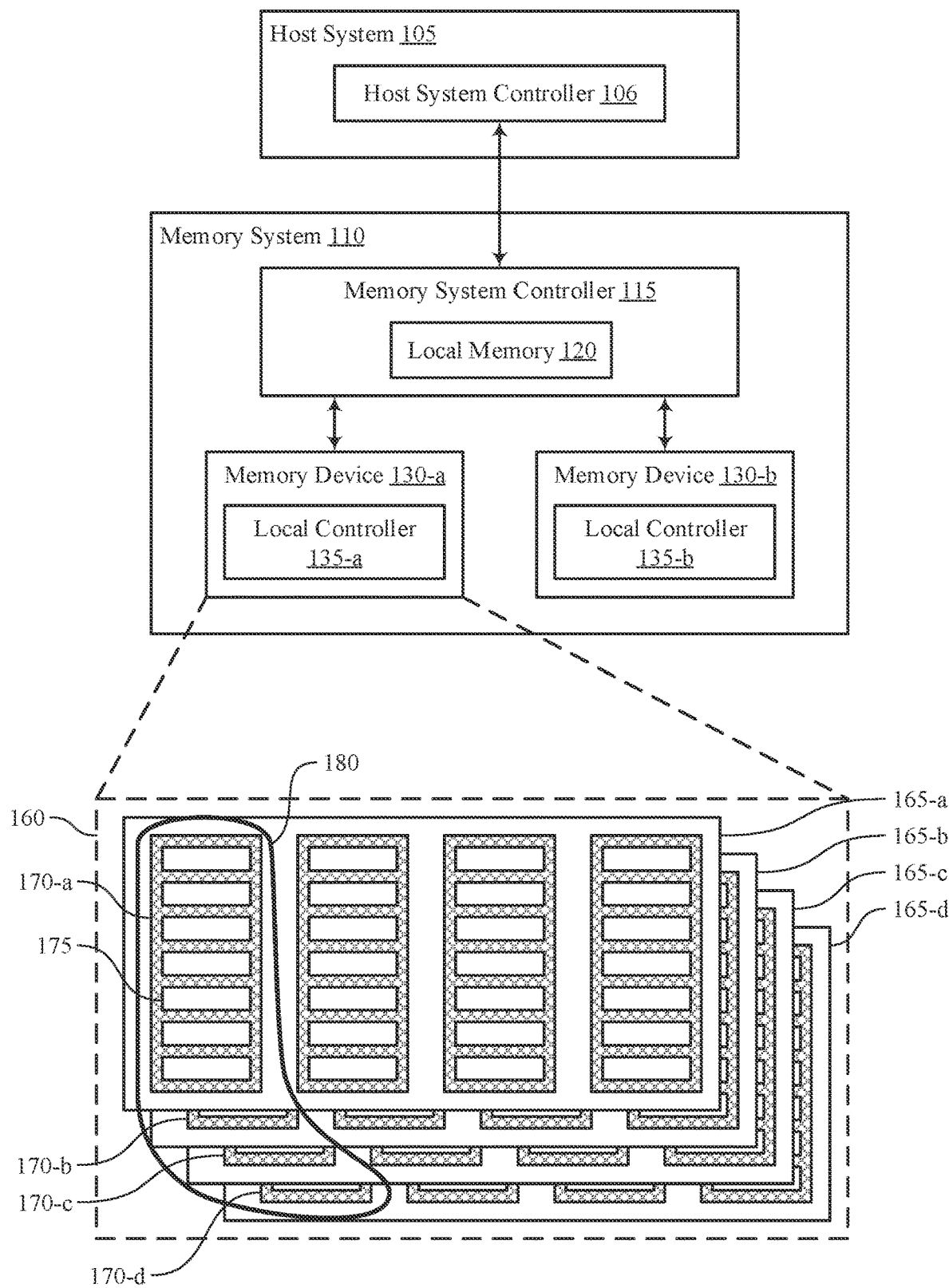
FIG. 1 illustrates an example of a system that supports techniques for memory zone size adjustment in accordance with examples as disclosed herein.
Figure 2:
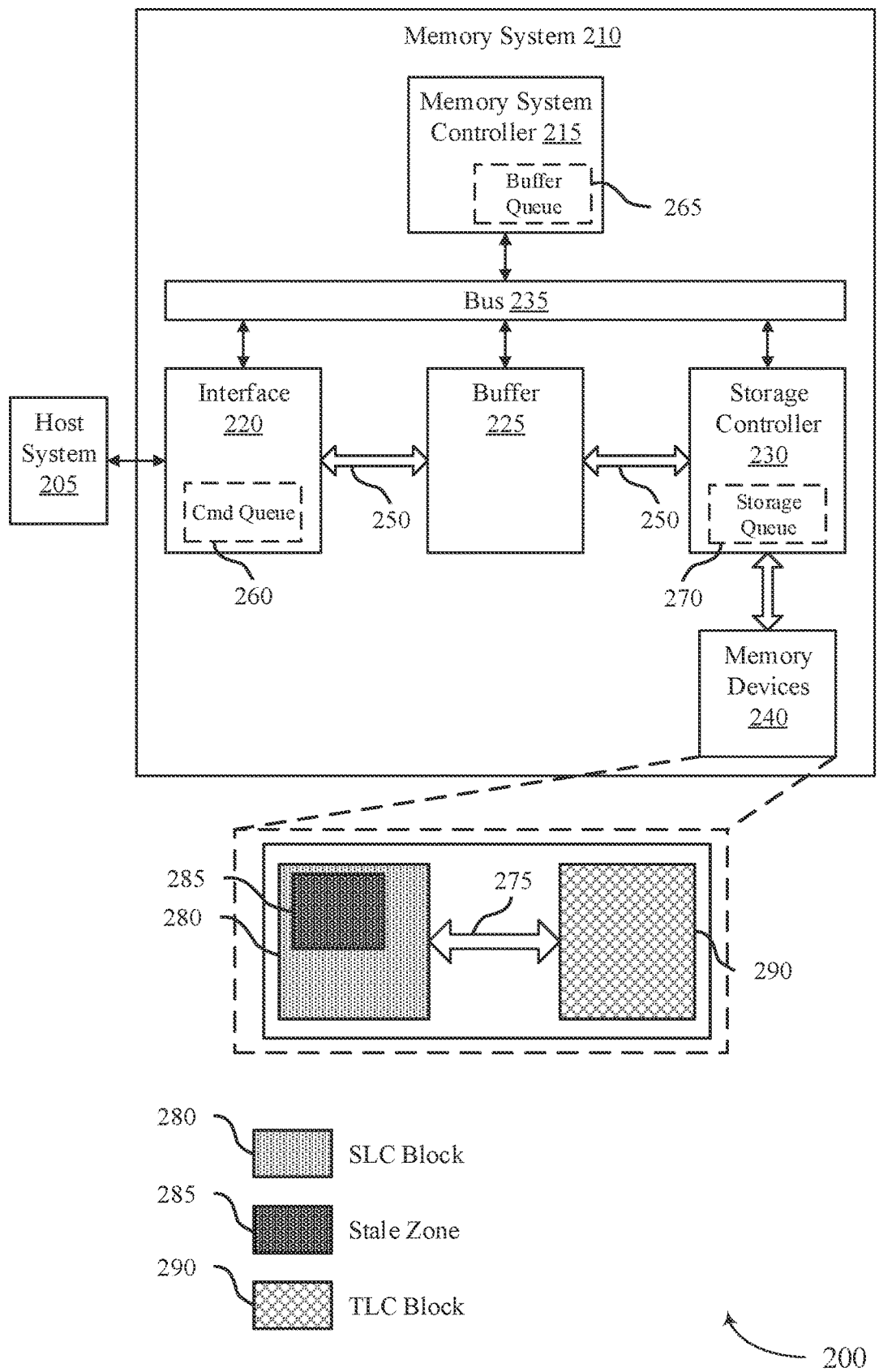
FIG. 2 illustrates an example of a system that supports techniques for memory zone size adjustment in accordance with examples as disclosed herein.

Features of the disclosure are initially described in the context of systems, devices, and circuits with reference to FIGS. 1-2. Features of the disclosure are described in the context of process flows with reference to FIGS. 3-4. These and other features of the disclosure are further illustrated by and described in the context of an apparatus diagram and flowchart that relate to techniques for memory zone size adjustment with reference to FIGS. 5-6.

FIG. 1 illustrates an example of a system 100 that supports techniques for memory zone size adjustment in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 110, which may be coupled with the memory system 105. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a, and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as SLCs. Additionally or alternatively, a NAND memory device 130 may include memory cells configured to each store multiple bits of information, which may be referred to as multi-level cells (MLCs) if configured to each store two bits of information, as TLCs if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

The system 100 may include any quantity of non-transitory computer readable media that support techniques for memory zone size adjustment. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some examples, data may be transferred between blocks 170 of a memory device 130, such as a memory device 130-*a*. For example, data may initially be written to a first block 170-*a* (e.g., an SLC block 170-*a*), and subsequently be transferred to a second block 170-*b* (e.g., a TLC block 170-*b*) as part of a flush operation. In some cases, the first block 170-*a* may include a stale zone, with a corresponding stale zone size. Data stored in the stale zone may not be transferred from the first block 170-*a* to the second block 170-*b* during the flush operation.

In some cases, the stale zone size may be static (i.e., the stale zone size may not change). A static stale zone size may result in excess temporary data written during a WB mode being stored outside the stale zone. The excess temporary data may, in some cases, be transferred from the first block 170-*a* to the second block 170-*b*, during the flush operation.

The memory system 110 (e.g., via the memory system controller 115 or a local controller 135) may dynamically adjust (e.g., increase or decrease) the stale zone size in response to receiving the command to remove the temporary data. In some cases, the stale zone size may be determinized based on an amount of free space in the first block 170-*a*. Additionally or alternatively, the stale zone size may be determined based on host data sizes. For example, the stale zone size may be determined by comparing the size of the data to be deleted (e.g., as indicated in the unmap command) to a threshold. The host data sizes may indicate an amount of data deleted in the first block 170-*a*, the second block 170-*b*, or a combination thereof over a period of time (e.g., the amount of data deleted in a day). In some cases, the stale zone size may be adjusted to the default stale zone size. In other cases, the stale zone size may be adjusted based on host data sizes from previous periods (e.g., previous day's host delete data sizes).

FIG. 2 illustrates an example of a system 200 that supports techniques for memory zone size adjustment in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to sure the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

The memory device 240 may include an SLC block 280 and a TLC block 290. In some examples, the SLC block 280 may include a stale zone 285, where the stale zone 285 has a corresponding size. In some cases, temporary data associated with a WB or write booster mode from the host system 205 may be initially stored in the stale zone 285. The temporary data stored in the stale zone 285 may be retained during a transfer of data (e.g., as part of a flush operation) from the SLC block 280 to the TLC block 290 via a transfer path 275.

In some cases, the size of the state zone 285 may be static. A static size may result in excess temporary data written during a WB mode being stored outside the stale zone 285. The excess temporary data may, in some cases, be transferred from the SLC block 280 to the TLC block 290 via the transfer path 275. In some cases, the memory device 240 may receive a command (e.g., an unmap command) to remove the temporary data written during the WB mode. If the excess temporary data has been transferred from the SLC block 280 to the TLC block 290, removing the temporary data may include removing data from the TLC block 290, which may reduce efficiency of the memory device and cause unneeded power consumption, among other disadvantages.

The memory device 240 may dynamically adjust (e.g., increase) the size of the state zone 285 in response to receiving the command to remove the temporary data. Adjusting the size of the stale zone 285 may enable the memory device 240 to store additional temporary data in the stale zone 285, which may reduce the amount of temporary data transferred from the SLC block 280 to the TLC block 290 via the transfer path 275.

In some cases, the size of the stale zone 285 may be deterrminized based on an amount of free space in the SLC block 280. Additionally or alternatively, the size of the stale zone 285 may be determined based on host data sizes. For example, the size of the stale zone 285 may be determined by comparing the size of the data to be deleted (e.g., as indicated in the unmap command) to a threshold. The host data sizes may indicate an amount of data deleted in the SLC block 280, the TLC block 290, or a combination thereof over a period of time (e.g., the amount of data deleted in a day). In some cases, the size of the stale zone 285 may be adjusted to a default size. In other cases, the size of the stale zone 285 may be adjusted based on host data sizes from previous periods (e.g., a previous day's host delete data sizes).

Figure 3:
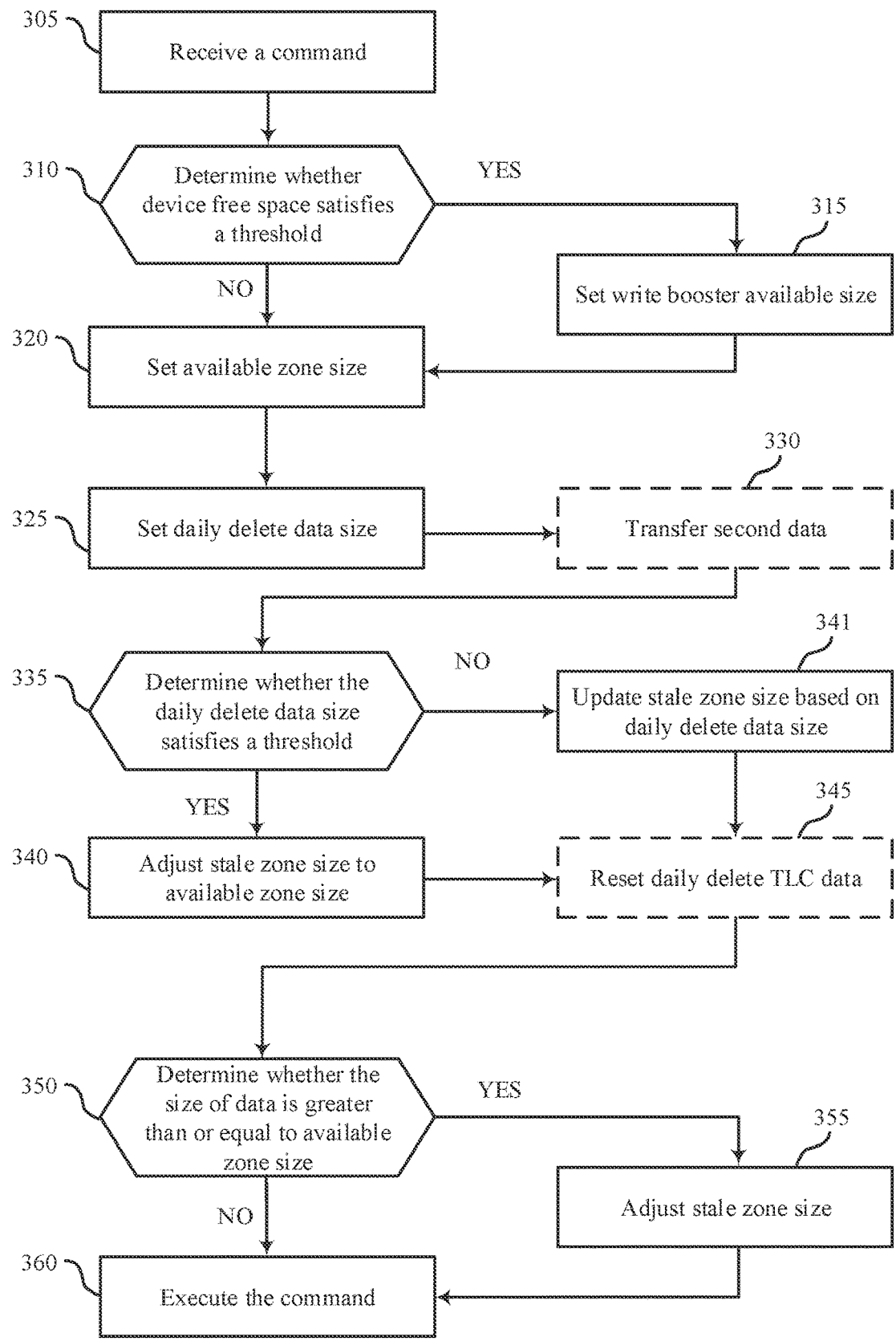
FIG. 3 illustrates an example of a process flow 300 that supports techniques for memory zone size adjustment in accordance with examples as disclosed herein.

FIG. 3 illustrates an example of a process flow 300 that supports techniques for memory zone size adjustment in accordance with examples as disclosed herein. The process flow 300 may be performed by components of a memory system, such as a memory system 110 described with reference to FIGS. 1 and 2. For example, the process flow 300 may be performed by a controller of a memory system or a memory device (or both) such as a memory system controller 115 or a local controller 135, respectively, as described with reference to FIG. 1. The process flow 300 may be implemented to reduce latency and power consumption and increase system performance, among other benefits. Aspects of the process flow 300 may be implemented by a controller, among other components. Additionally or alternatively, aspects of the process flow 300 may be implemented as instructions stored in memory (e.g., firmware stored in a memory coupled with the memory system controller 115 or the local controller 135). For example, the instructions, if executed by a controller (e.g., a memory system controller 115, a local controller 135), may cause the controller to perform the operations of the process flow 300. In the following description of process flow 300, the operations may be performed in a different order than the order shown. For example, specific operations may also be left out of process flow 300, or other operations may be added to process flow 300.

The memory system may operate in a WB or write booster mode. During the WB mode, the memory system may store data from the host in a first block of memory cells (e.g., an SLC block) configured to store host-written data. In some cases, the memory system may store recent data from the host device in a stale zone of the first block of memory cells. In some examples, the data stored in the stale zone may include temporary data. The temporary data may be removed in response to a periodically issued command (e.g., a daily unmap command).

At 305, a command may be received. For example, the memory system may receive a command to remove data associated with the first block of memory cells. The command may be an example of an unmap command, and may be associated with the WB or write booster mode of the memory system. The unmap command may include an indication to remove temporary data written to the first block of memory cells during a WB or write booster mode of the memory system. In some cases, the temporary data may have been transferred (e.g., as part of a flush operation) from the first block of memory cells to a second block of memory cells, such as a TLC block. In other cases, the temporary data may have been stored in the stale zone, and thus remained in the first block of memory cells during the flush operation.

At 310, in response to receiving the command at 305, it may be determined whether a device free space satisfies a threshold. For example, the controller may determine whether the device free space (i.e., the unused space of the memory system) exceeds a threshold based on an amount of space (e.g., a write booster size) associated with a write booster or WB mode of the memory system. In some cases, the threshold may be an integer multiple of the write booster size, such as three times the write booster size. The write booster size may be configured to indicate an amount of data to be written during the WB or write booster mode. However, in some cases, the write booster size may exceed an available size for the write booster (e.g., a write booster available size or a zone size). For example, data associated with the write booster may be transferred (e.g., during the flush operation) from the first block of memory cells to the second block of memory cells. Thus, if the size of the data associated with the write booster on the first block of memory cells exceeds the threshold, the second block of memory cells may not have sufficient space to store the data associated with the write booster.

If, at 310, it is determined that the device free space satisfies the threshold, 315 may be performed. At 315, the write booster available size may be set. For example, the controller may adjust the write booster available size to be a fraction of the device free space. In some examples, such as when the data associated with the write booster is configured to be transferred from the first block of memory cells to the second block of memory cells, the write booster available size may be set to a third of the device free space. That is, the write booster available size may be set to provide sufficient space to transfer the data associated with the write booster from the first block of memory cells to the second block of memory cells.

If, at 310, it is determined that the device free space does not satisfy the threshold, 320 may be performed without first performing 315. At 320, an available zone size may be set. For example, the controller may set the available zone size based on the device free space, the write booster available size, a default stale zone size, or a combination thereof. The available zone size may indicate a maximum size available for increasing the stale zone size. That is, the available zone may indicate how much additional space the stale zone may occupy. The default stale zone size may indicate a starting value for the stale zone size. In some cases, the default stale zone size may be, for example, 2 GB. In some cases, the available zone size may indicate a maximum size available for the stale zone. The available zone size may be based on for example, the difference of one third of the device free space and the sum of the write booster available size and the default zone size. Additionally or alternatively, the available zone size may be updated when a block of memory cells is opened for host written data.

At 325, a delete data size may be set (e.g., determined, calculated, updated). For example, the memory controller may calculate a daily delete TLC data size. The memory controller may record the amount of data associated with the WB mode that is transferred from the first block of memory cells to the second block of memory cells, and subsequently deleted over a set of one or more unsnap commands issued in a day. In some examples, the memory controller may calculate a host delete data size, which may include an amount of space corresponding to the total data indicated in the command received at 305. Additionally or alternatively, the memory controller may calculate a host delete SLC data size, which may include an amount of space corresponding to the data indicated in the command received at 305 that remains in the first block of memory cells. In some examples, the memory controller may determine a last daily delete TLC data size, which may include an amount of data corresponding to a previous day's daily delete TLC data size may be determined. In some examples, the delete data sizes may be updated in response to the command received at 305.

In some cases, at 330, data may optionally be transferred from the first block of memory cells to a second block of memory cells. The transferred data may be different from the data associated with the command received at 305. For example, the memory system may transfer data not stored in the stale zone from the first block of memory cells to the second block of memory cells, as part of one or more background operations. In some cases, transferring the data from the first block of memory cells to the second block of memory cells may be part of a flush operation.

At 335, it may be determined whether the daily delete data size set at 325 satisfies a threshold. For example, the memory controller may determine whether the daily delete TLC data size is greater than the available zone size. In some cases, determining that the daily delete TLC data size is greater than the available zone size may indicate that the memory system may benefit from a larger stale zone size than the current stale zone size, since a larger stale zone size may mitigate (i.e., reduce) the amount of temporary data transferred from the first block of memory cells to the second block of memory cells and subsequently deleted.

If, at 335, it is determined that the daily delete data size set at 325 satisfies the threshold, 340 may be performed. At 340, a first zone size (i.e., the stale zone size) may be adjusted (e.g., set or updated) to the available zone size based on determining that the daily delete TLC data size exceeds the threshold set. If, at 335, it is determined that the daily delete data size set at 325 does not satisfy the threshold, 341 may be performed. At 341, the first zone size may be updated based on the daily delete data size. For example, the memory controller may update the stale zone size based on the sum of the current stale zone size and the daily delete TLC data size based on determining that the daily delete TLC data size does not exceed the threshold.

In some cases, at 345, the daily delete TLC data size may be reset. For example, the memory controller may optionally reset (i.e., set to zero) the daily delete TLC data size based on recognizing a nightly unmap command sequence or a set of unmap command sequences. Resetting the daily delete TLC data size may be part of monitoring the amount of data associated with an unmap command that has been transferred from an SLC block to a TLC block over a period of time (e.g., a day). That is, the daily delete TLC data size may indicate the amount of data associated with an unmap command that has been transferred from an SLC block to a TLC block in a day, and resetting the daily delete TLC data size may enable the controller to maintain an accurate record.

At 350, it may be determined whether the size of the data indicated in the command received at 305 is greater than or equal to the available zone size. For example, the memory controller may compare the stale zone size set at 340 to the available zone size determined at 320. If, at 350, it is determined that the size of the data is greater than or equal to the available zone size, 355 may be performed. At 355, the stale zone size may be adjusted (e.g., set, reduced) to the available zone size. That is, the stale zone size may be set to a second zone size. If, at 350, it is determined that the size of the data is not greater than or equal to the available zone size, 360 may be performed without first performing 355.

At 360, the command received at 305 may be executed. For example, the memory controller may execute the unmap command based on the stale zone size set at 340 and, in some cases, adjusted at 355. In some examples, executing the unmap command may include removing data (e.g., temporary data) from the first block of memory cells (e.g., the SLC block) as indicated in the command. In some cases, executing the unmap command may additionally include removing data (e.g., temporary data) that has been transferred from the first block of memory cells to the second block of memory cells (e.g., the TLC block).

In some examples, the steps of process flow 300 may be performed periodically (e.g., on a nightly basis) is response to a periodic unmap command. Thus, one or more parameters, such as the starting stale zone size and the daily delete TLC data size, among other examples, may be based on previous iterations of the process flow 300. Additionally or alternatively, one or more parameters for process flow 300 may be independent from previous iterations of process flow 300, such as the write booster size and write booster available size, among other examples.

Figure 4:
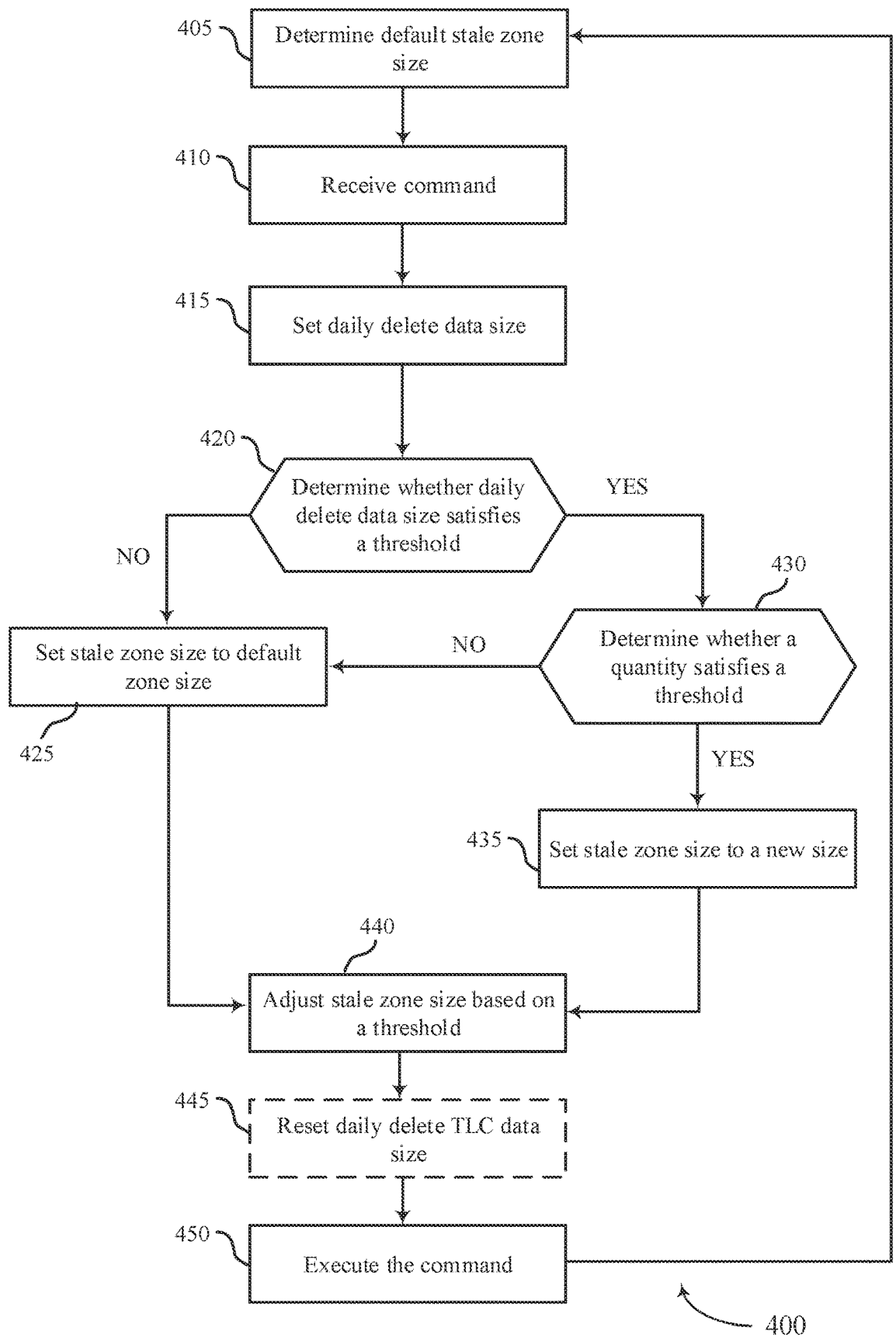
FIG. 4 illustrates an example of a process flow 400 that supports techniques for memory zone size adjustment in accordance with examples as disclosed herein.

FIG. 4 illustrates an example of a process flow 400 that supports techniques for memory zone size adjustment in accordance with examples as disclosed herein. The process flow 400 may be performed by components of a memory system, such as a memory system 110 described with reference to FIGS. 1 and 2. For example, the process flow 400 may be performed by a controller of a memory system or a memory device (or both) such as a memory system controller 115 or a local controller 135, respectively, as described with reference to FIG. 1. The process flow 400 may be implemented to reduce latency and power consumption and increase system performance, among other benefits. Aspects of the process flow 400 may be implemented by a controller, among other components. Additionally or alternatively, aspects of the process flow 400 may be implemented as instructions stored in memory (e.g., firmware stored in a memory coupled with the memory system controller 115 or the local controller 135). For example, the instructions, if executed by a controller (e.g., a memory system controller 115, a local controller 135), may cause the controller to perform the operations of the process flow 400. In the following description of process flow 400, the operations may be performed in a different order than the order shown. For example, specific operations may also be left out of process flow 400, or other operations may be added to process flow 400.

The memory system may operate in a WB or write booster mode. During the WB mode, the memory system may store data from the host in a first block of memory cells (e.g., an SLC block) configured to store host-written data (i.e., the memory system may store the latest data from the host device in a stale zone). In some examples, the data stored in the stale zone may include temporary data. The temporary data may be removed in response to a periodically issued command (e.g., a daily unmap command).

At 405, a default stale zone size may be determined. For example, the default stale zone size may be set by the memory controller or otherwise indicated by firmware, previous iterations of process flow 400, or the like. The default stale zone size may indicate a starting stale zone size for the stale zone. In some examples, the default stale zone size may be 2 gigabytes (GB).

At 410, a command may be received. For example, the memory system may receive a command to remove data associated with a block of memory cells. The command may be an example of an unmap command, and may be associated with the WB or write booster mode of the memory system. The unmap command may include an indication to remove temporary data written to the first block of memory cells during a WB or write booster mode of the memory system. In some cases, the temporary data may have been transferred from the first block of memory cells to a second block of memory cells, such as a TLC block, as part of a flush operation. In other cases, the temporary data may be stored in the stale zone, and thus remain in the first block of memory cells during the flush operation.

At 415, a delete data size may be set (i.e., determined, calculated, updated). For example, the memory controller may calculate a daily delete TLC data size. The memory controller may record the amount of data associated with the WB mode that is transferred from the first block of memory cells to the second block of memory cells, and subsequently deleted over a set of one or more unmap commands issued in a day. In some examples, the memory controller may calculate a host delete data size, which may include an amount of space corresponding to the total data indicated in the command received at 410. Additionally or alternatively, the memory controller may calculate a host delete SLC data size, which may include an amount of space corresponding to the data indicated in the command received at 410 that remains in the first block of memory cells. In some examples, the memory controller may determine a last daily delete TLC data size, which may include an amount of data corresponding to a previous day's daily delete TLC data size may be determined. In some examples, the delete data sizes may be updated in response to the command received at 410.

At 420, it may be determined whether the daily delete data size set at 415 satisfies a threshold. For example, the memory controller may determine whether the host delete SLC data size is greater than a threshold (e.g., zero). Further, the memory controller may determine whether the host delete data size exceeds a second threshold (e.g., a threshold greater than zero).

If, at 420, it is determined that the daily delete data size set at 415 does not satisfy the threshold, 425 may be performed. At 425, the stale zone size (i.e., a first zone size) may be set (i.e., adjusted to) to the default stale zone size. If, at 420, it is determined that the daily delete data size set at 415 satisfies the threshold, 430 may be performed. At 430, it may be determined whether a quantity satisfies a threshold. For example, the memory controller may determine whether a quantity based on the stale zone size and the last daily delete TLC data size (e.g., a difference between the stale zone size and the last daily delete TLC data size) exceeds a threshold. In some examples, the threshold may be the size of the of the default stale zone determined at 405. If, at 430, it is determined that the quantity does not satisfy the threshold, 425 may be performed as described herein.

If, at 430, it is determined that the quantity satisfies the threshold, 435 may be performed. At 435, the stale zone size (i.e., the first zone size) may be set (i.e., calculated, adjusted) to a new size. For example, the memory controller may set the stale zone size to the new size based on the current stale zone size and the last daily delete TLC data size (e.g., the difference between the current stale zone size and the last daily delete TLC data size).

At 440, the stale zone size may be adjusted (e.g., to a second zone size) based on a threshold. For example, the memory controller may determine whether the stale zone size set at 425 or 435 exceeds the threshold, where the threshold may be an available stale zone size (e.g., the available zone size discussed in reference to FIG. 3). If the stale zone size set at 425 or 435 exceeds the threshold, the stale zone size may be set (i.e., reduced, adjusted) to the available stale zone size.

In some cases, at 445, the daily delete TLC data size may be reset. For example, the memory controller may optionally reset (i.e., set to zero) the daily delete TLC data size based on recognizing a nightly unmap command sequence or a set of unmap command sequences. Resetting the daily delete TLC data size may be part of monitoring the amount of data associated with an unmap command that has been transferred from the first block of memory cells to the second block of memory cells over a period of time (e.g., a day). That is, the daily delete TLC data size may indicate the amount of data associated with an unmap command that has been transferred from the first block of memory cells to the second block of memory cells in a day, and resetting the daily delete TLC data size may allow an accurate record to be maintained.

At 450, the command received at 410 may be executed. For example, the memory controller may execute the unmap command based on the stale zone size set at 425 or 435 and, in some cases, adjusted at 440. In some examples, executing the unmap command may include removing data (e.g., temporary data) from the first block of memory cells (e.g., the SLC block) as indicated in the command. In some cases, executing the unmap command may additionally include removing data (e.g., temporary data) that has been transferred from the first block of memory cells to the second block of memory cells (e.g., the TLC block).

In some examples, the steps of process flow 400 may be performed periodically (e.g., on a nightly basis) is response to a periodic unmap command. Thus, one or more parameters such as the starting stale zone size and the daily delete TLC data size, among other examples, may be based on previous iterations of the process flow 400. Additionally or alternatively, one or more parameters for process flow 400 may be independent from previous iterations of process flow 400, such as the available stale zone size, among other examples.

Figure 5:
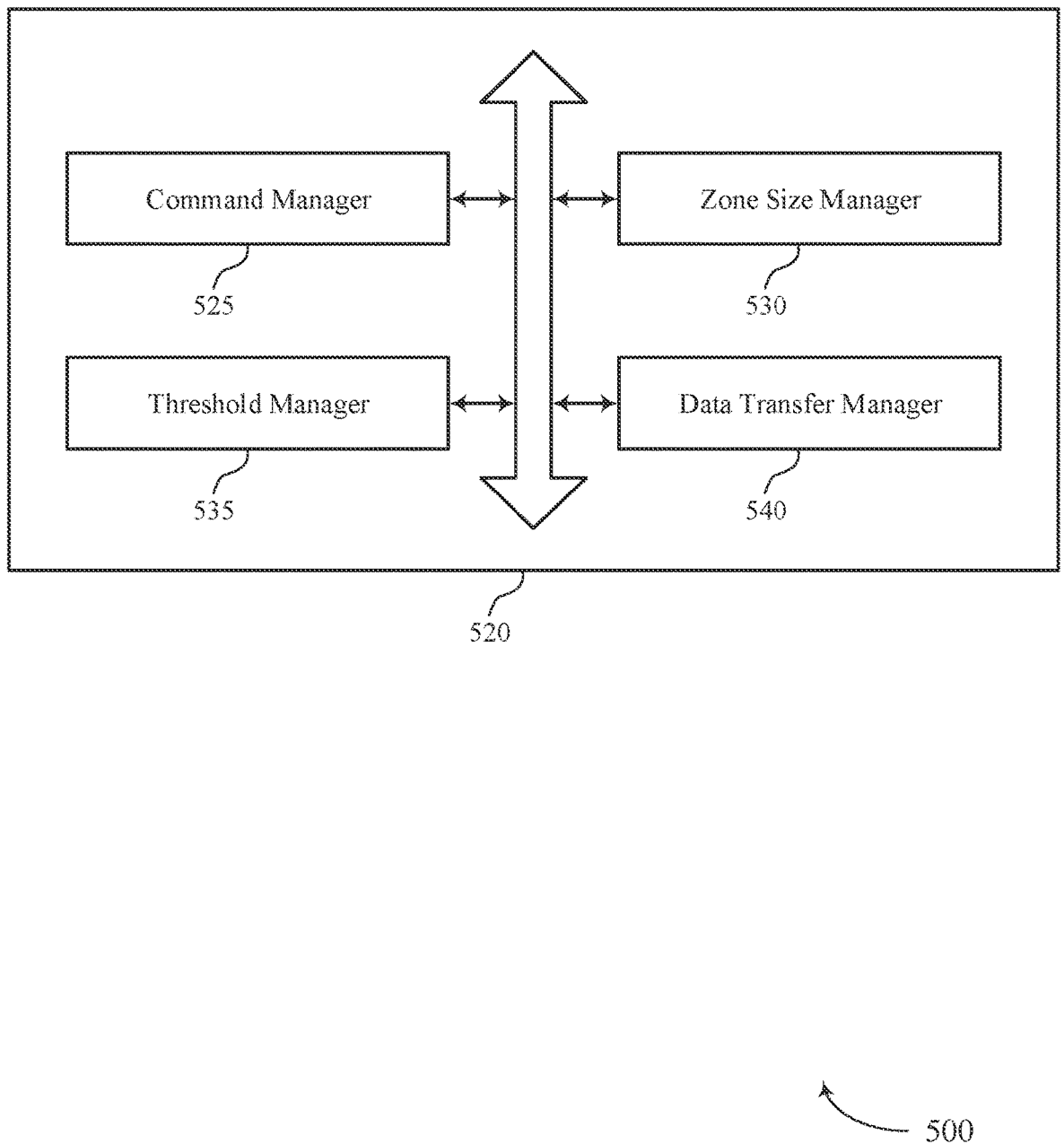
FIG. 5 shows a block diagram of a memory system that supports techniques for memory zone size adjustment in accordance with examples as disclosed herein.

FIG. 5 shows a block diagram 500 of a memory system 520 that supports techniques for memory zone size adjustment in accordance with examples as disclosed herein. The memory system 520 may be an example of aspects of a memory system as described with reference to FIGS. 1 through 4. The memory system 520, or various components thereof, may be an example of means for performing various aspects of techniques for memory zone size adjustment as described herein. For example, the memory system 520 may include a command manager 525, a zone size manager 530, a threshold manager 535, a data transfer manager 540, or any combination thereof. Each of these components may communicate, directly or indirectly, with one another (e.g., via one or more buses).

The command manager 525 may be configured as or otherwise support a means for receiving, at a memory system, a command to remove data associated with a block of memory cells. The zone size manager 530 may be configured as or otherwise support a means for setting, based at least in part on receiving the command, a first zone size that is based at least in part on a size of the data, the first zone size including a first set of memory cells in the block of memory cells and corresponding to a first amount of space including data to be removed based at least in part on the received command. The threshold manager 535 may be configured as or otherwise support a means for determining whether the first zone size satisfies a threshold that is based at least in part on an available zone size corresponding to a second amount of space available to store data in the block of memory cells. In some examples, the zone size manager 530 may be configured as or otherwise support a means for setting a second zone size based at least in part on determining that the first zone size satisfies the threshold, the second zone size including a second set of memory cells in the block of memory cells, where the second zone size is less than or equal to the available zone size. In some examples, the command manager 525 may be configured as or otherwise support a means for executing the received command based at least in part on setting the second zone size.

In some examples, the zone size manager 530 may be configured as or otherwise support a means for setting the available zone size based at least in part on the second amount of space and a third zone size corresponding to a third amount of space associated with a write booster at the memory system.

In some examples, the threshold manager 535 may be configured as or otherwise support a means for determining whether the second amount of space exceeds a second threshold. In some examples, the zone size manager 530 may be configured as or otherwise support a means for setting the third zone size based at least in part on the determining that the second amount of space exceeds the second threshold.

In some examples, to support determining whether the first zone size satisfies the threshold, the threshold manager 535 may be configured as or otherwise support a means for determining whether the size of the data is greater than or equal to the available zone size, where setting the second zone size is based at least in part on determining that the size of the data is greater than or equal to the available zone size.

In some examples, to support determining whether the first zone size satisfies the threshold, the threshold manager 535 may be configured as or otherwise support a means for determining whether the size of the data satisfies a second threshold, where setting the second zone size is based at least in part on determining that the size of the data satisfies the second threshold.

In some examples, the second threshold is associated with data stored in the block of memory cells, a second block of memory cells, or both.

In some examples, the zone size manager 530 may be configured as or otherwise support a means for resetting the first zone size to a default zone size based at least in part on executing the received command.

in some examples, the data transfer manager 540 may be configured as or otherwise support a means for transferring, after setting the first zone size, second data from the block of memory cells to a second block of memory cells, the second data different than the data associated with the received command.

In some examples, the block of memory cells includes single level cells. In some examples, the second block of memory cells includes tri-level cells.

in some examples, the received command includes an unmap command.

Figure 6:
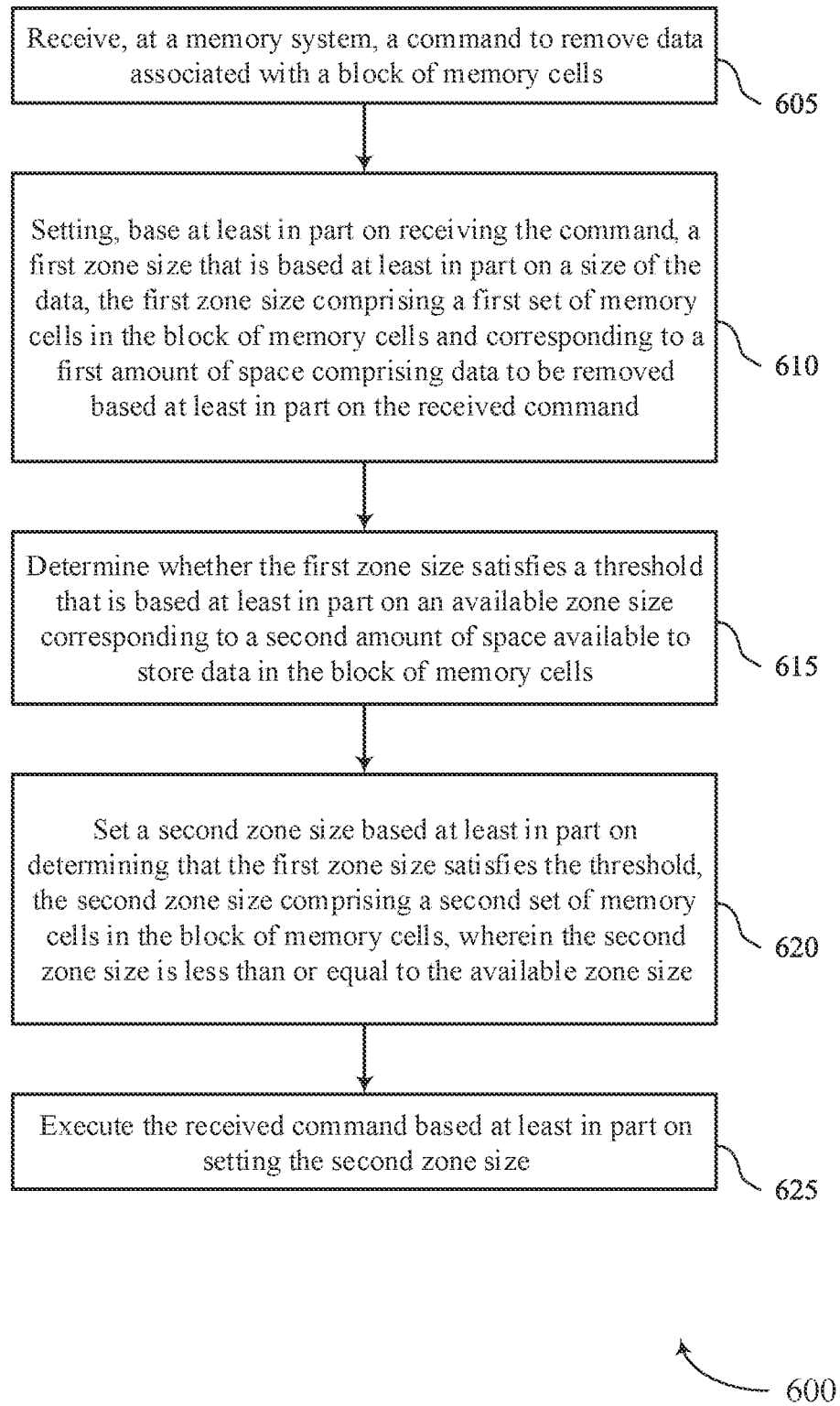
FIG. 6 shows a flowchart illustrating a method or methods that support techniques for memory zone size adjustment in accordance with examples as disclosed herein.

FIG. 6 shows a flowchart illustrating a method 600 that supports techniques for memory zone size adjustment in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally or alternatively, the memory system may perform aspects of the described functions using special-purpose hardware.

At 605, the method may include receiving, at a memory system, a command to remove data associated with a block of memory cells. The operations of 605 may be performed in accordance with examples as disclosed herein. In some examples, aspects of the operations of 605 may be performed by a command manager 525 as described with reference to FIG. 5.

At 610, the method may include setting, based at least in part on receiving the command, a first zone size that is based at least in part on a size of the data, the first zone size including a first set of memory cells in the block of memory cells and corresponding to a first amount of space including data to be removed based at least in part on the received command. The operations of 610 may be performed in accordance with examples as disclosed herein. In some examples, aspects of the operations of 610 may be performed by a zone size manager 530 as described with reference to FIG. 5.

At 615, the method may include determining whether the first zone size satisfies a threshold that is based at least in part on an available zone size corresponding to a second amount of space available to store data in the block of memory cells. The operations of 615 may be performed in accordance with examples as disclosed herein. In some examples, aspects of the operations of 615 may be performed by a threshold manager 535 as described with reference to FIG. 5.

At 620, the method may include setting a second zone size based at least in part on determining that the first zone size satisfies the threshold, the second zone size including a second set of memory cells in the block of memory cells, where the second zone size is less than or equal to the available zone size. The operations of 620 may be performed in accordance with examples as disclosed herein. In some examples, aspects of the operations of 620 may be performed by a zone size manager 530 as described with reference to FIG. 5.

At 625, the method may include executing the received command based at least in part on setting the second zone size. The operations of 625 may be performed in accordance with examples as disclosed herein. In some examples, aspects of the operations of 625 may be performed by a command manager 525 as described with reference to FIG. 5.

In some examples, an apparatus as described herein may perform a method or methods, such as the method 600. The apparatus may include, features, circuitry, logic, means, or instructions (e.g., a non-transitory computer-readable medium storing instructions executable by a processor) for receiving, at a memory system, a command to remove data associated with a block of memory cells, setting, based at least in part on receiving the command, a first zone size that is based at least in part on a size of the data, the first zone size including a first set of memory cells in the block of memory cells and corresponding to a first amount of space including data to be removed based at least in part on the received command, determining whether the first zone size satisfies a threshold that is based at least in part on an available zone size corresponding to a second amount of space available to store data in the block of memory cells, setting a second zone size based at least in part on determining that the first zone size satisfies the threshold, the second zone size including a second set of memory cells in the block of memory cells, where the second zone size is less than or equal to the available zone size, and executing the received command based at least in part on setting the second zone size.

Some examples of the method 600 and the apparatus described herein may further include operations, features, circuitry, logic, means, or instructions for setting the available zone size based at least in part on the second amount of space and a third zone size corresponding to a third amount of space associated with a write booster at the memory system.

Some examples of the method 600 and the apparatus described herein may further include operations, features, circuitry, logic, means, or instructions for determining whether the second amount of space exceeds a second threshold and setting the third zone size based at least in part on the determining that the second amount of space exceeds the second threshold.

In some examples of the method 600 and the apparatus described herein, determining whether the first zone size satisfies the threshold may include operations, features, circuitry, logic, means, or instructions for determining whether the size of the data may be greater than or equal to the available zone size, where setting the second zone size may be based at least in part on determining that the size of the data may be greater than or equal to the available zone size.

In some examples of the method 600 and the apparatus described herein, determining whether the first zone size satisfies the threshold may include operations, features, circuitry, logic, means, or instructions for determining whether the size of the data satisfies a second threshold, where setting the second zone size may be based at least in part on determining that the size of the data satisfies the second threshold.

In some examples of the method 600 and the apparatus described herein, the second threshold may be associated with data stored in the block of memory cells, a second block of memory cells, or both.

Some examples of the method 600 and the apparatus described herein may further include operations, features, circuitry, logic, means, or instructions for resetting the first zone size to a default zone size based at least in part on executing the received command.

Some examples of the method 600 and the apparatus described herein may further include operations, features, circuitry, logic, means, or instructions for transferring, after setting the first zone size, second data from the block of memory cells to a second block of memory cells, the second data different than the data associated with the received command.

In some examples of the method 600 and the apparatus described herein, the block of memory cells includes single level cells and the second block of memory cells includes tri-level cells.

In some examples of the method 600 and the apparatus described herein, the received command includes an unmap command.

It should be noted that the methods described above describe possible implementations, and that the operations and the steps may be rearranged or otherwise modified and that other implementations are possible. Further, portions from two or more of the methods may be combined.

An apparatus is described. The apparatus may include a memory device and a controller coupled with the memory device and configured to cause the apparatus to receive, at the memory device, a command to remove data associated with a block of memory cells, set, based at least in part on receiving the command, a first zone size that is based at least in part on a size of the data, the first zone size including a first set of memory cells in the block of memory cells and corresponding to a first amount of space including data to be removed based at least in part on the received command, determine whether the first zone size satisfies a threshold that is based at least in part on an available zone size corresponding to a second amount of space available to store data in the block of memory cells, set a second zone size based at least in part on determining that the first zone size satisfies the threshold, the second zone size including a second set of memory cells in the block of memory cells, where the second zone size is less than or equal to the available zone size, and execute the received command based at least in part on setting the second zone size.

In some examples, the apparatus may include set the available zone size based at least in part on the second amount of space and a third zone size corresponding to a third amount of space associated with a write booster at the memory device.

In some examples, the apparatus may include determine whether the second amount of space exceeds a second threshold and set the third zone size based at least in part on the determining that the second amount of space exceeds the second threshold.

In some examples, the apparatus may include determine whether the size of the data may be greater than or equal to the available zone size, where setting the second zone size may be based at least in part on determining that the size of the data may be greater than or equal to the available zone size.

In some examples, the apparatus may include determine whether the size of the data satisfies a second threshold, where setting the second zone size may be based at least in part on determining that the size of the data satisfies the second threshold.

In some examples of the apparatus, the second threshold may be associated with data stored in the block of memory cells, a second block of memory cells, or both.

In some examples, the apparatus may include reset the first zone size to a default zone size based at least in part on executing the received command.

In some examples, the apparatus may include transfer, after setting the first zone size, second data from the block of memory cells to a second block of memory cells, the second data different than the data associated with the received command.

In some examples of the apparatus, the block of memory cells includes single level cells and the second block of memory cells includes tri-level cells.

In some examples of the apparatus, the received command includes an umnap command.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors, The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
    a memory device; and
    a controller coupled with the memory device and configured to cause the apparatus to:
        perform a first flushing operation to transfer first data from a first block of memory cells to a second block of memory cells;
        receive, at the memory device, a command to remove temporary data from at least the first block of memory cells based at least in part on performing the first flushing operation, wherein the first block of memory cells comprises a zone having a first zone size, and wherein the first zone size corresponds to a first amount of memory cells that are used to store at least a portion of the temporary data;
        determine whether a second amount of memory cells satisfies a threshold that is based at least in part on an available zone size, wherein the second amount of memory cells is based at least in part on a size of the temporary data, and wherein the available zone size corresponds to a third amount of memory cells of the first block of memory cells available to store the temporary data;
        configure the zone to increase or decrease by a quantity of memory cells from the first zone size to a second zone size in the first block of memory cells based at least in part on determining whether the second amount of memory cells satisfies the threshold, wherein the second zone size corresponds to a fourth amount of memory cells of the first block of memory cells, wherein the fourth amount of memory cells is less than or equal to the third amount of memory cells of the first block of memory cells associated with the available zone size;
        execute the received command to remove the temporary data from at least the first block of memory cells based at least in part on configuring the zone to increase or decrease; and
        store, based at least in part on executing the received command, second temporary data in the fourth amount of memory cells of the first block of memory cells.

2. The apparatus of claim 1, wherein the controller is further configured to cause the apparatus to:
    set the available zone size based at least in part on the third amount of memory cells and on a third zone size corresponding to a fifth amount of memory cells of the first block of memory cells, the third zone size being associated with a write booster at the memory device.

3. The apparatus of claim 2, wherein the controller is further configured to cause the apparatus to:
    determine whether the third amount of memory cells exceeds a second threshold; and
    set the third zone size based at least in part on determining that the third amount of memory cells exceeds the second threshold.

4. The apparatus of claim 1, wherein, to configure the zone to increase or decrease, the controller is configured to cause the apparatus to:
    configure the zone to increase by the quantity of memory cells to the second zone size based at least in part on determining that the second amount of memory cells satisfies the threshold, wherein the second amount of memory cells is equal to the third amount of memory cells; or
    configure the zone to decrease by the quantity of memory cells to the second zone size based at least in part on determining that the second amount of memory cells fails to satisfy the threshold, wherein the second amount of memory cells is less than the third amount of memory cells.

5. The apparatus of claim 1, wherein the controller is further configured to cause the apparatus to:
    determine whether the size of the temporary data satisfies a second threshold, wherein configuring the zone to increase or decrease is further based at least in part on determining whether the size of the temporary data satisfies the second threshold.

6. The apparatus of claim 5, wherein the second threshold is associated with the first data stored in the first block of memory cells, the second block of memory cells, or both.

7. The apparatus of claim 1, wherein the controller is further configured to cause the apparatus to:
    reset a value indicating the second amount of memory cells based at least in part on executing the received command.

8. The apparatus of claim 1, wherein:
the first block of memory cells comprises single level cells; and
the second block of memory cells comprises tri-level cells.

9. The apparatus of claim 1, wherein the received command comprises an unmap command.

10. The apparatus of claim 1, wherein the first data comprises at least a second portion of the temporary data.

11. A non-transitory computer-readable medium storing code comprising instructions which, when executed by a processor of an electronic device, cause the electronic device to:
perform a first flushing operation to transfer first data from a first block of memory cells to a second block of memory cells;
receive, at the electronic device, a command to remove temporary data from at least the first block of memory cells based at least in part on performing the first flushing operation, wherein the first block of memory cells comprises a zone having a first zone size, and wherein the first zone size corresponds to a first amount of memory cells that are used to store at least a portion of the temporary data;
determine whether a second amount of memory cells satisfies a threshold that is based at least in part on an available zone size, wherein the second amount of memory cells is based at least in part on a size of the temporary data, and wherein the available zone size corresponds to a third amount of memory cells of the first block of memory cells available to store the temporary data;
configure the zone to increase or decrease by a quantity of memory cells from the first zone size to a second zone size in the first block of memory cells based at least in part on determining whether the second amount of memory cells satisfies the threshold, wherein the second zone size corresponds to a fourth amount of memory cells of the first block of memory cells, wherein the fourth amount of memory cells is less than or equal to the third amount of memory cells of the first block of memory cells associated with the available zone size;
execute the received command to remove the temporary data from at least the first block of memory cells based at least in part on configuring the zone to increase or decrease; and
store, based at least in part on executing the received command, second temporary data in the fourth amount of memory cells of the first block of memory cells.

12. The non-transitory computer-readable medium of claim 11, wherein the instructions, when executed by the processor of the electronic device, further cause the electronic device to:
set the available zone size based at least in part on the third amount of memory cells and a third zone size corresponding to a fifth amount of memory cells of the first block of memory cells, the third zone size being associated with a write booster at the electronic device.

13. The non-transitory computer-readable medium of claim 12, wherein the instructions, when executed by the processor of the electronic device, further cause the electronic device to:
determine whether the third amount of memory cells exceeds a second threshold; and
set the third zone size based at least in part on determining that the third amount of memory cells exceeds the second threshold.

14. The non-transitory computer-readable medium of claim 11, wherein the instructions to configure the zone to increase or decrease, when executed by the processor of the electronic device, cause the electronic device to:
configure the zone to increase by the quantity of memory cells to the second zone size based at least in part on determining that the second amount of memory cells satisfies the threshold, wherein the second amount of memory cells is equal to the third amount of memory cells; or
configure the zone to decrease by the quantity of memory cells to the second zone size based at least in part on determining that the second amount of memory cells fails to satisfy the threshold, wherein the second amount of memory cells is less than the third amount of memory cells.

15. The non-transitory computer-readable medium of claim 11, wherein the instructions, when executed by the processor of the electronic device, further cause the electronic device to:
determine whether the size of the temporary data satisfies a second threshold, wherein configuring the zone to increase or decrease is further based at least in part on determining whether the size of the temporary data satisfies the second threshold.

16. The non-transitory computer-readable medium of claim 15, wherein the second threshold is associated with the first data stored in the first block of memory cells, the second block of memory cells, or both.

17. The non-transitory computer-readable medium of claim 11, wherein the instructions, when executed by the processor of the electronic device, further cause the electronic device to:
reset a value indicating the second amount of memory cells based at least in part on executing the received command.

18. The non-transitory computer-readable medium of claim 11, wherein:
the first block of memory cells comprises single level cells; and
the second block of memory cells comprises tri-level cells.

19. The non-transitory computer-readable medium of claim 11, wherein the first data comprises at least a second portion of the temporary data.

20. A method, comprising:
performing, at a memory system, a first flushing operation to transfer first data from a first block of memory cells to a second block of memory cells;
receiving, at the memory system, a command to remove temporary data from at least the first block of memory cells based at least in part on performing the first flushing operation, wherein the first block of memory cells comprises a zone having a first zone size, and wherein the first zone size corresponds to a first amount of memory cells that are used to store at least a portion of the temporary data;
determining whether a second amount of memory cells satisfies a threshold that is based at least in part on an available zone size, wherein the second amount of memory cells is based at least in part on a size of the temporary data, and wherein the available zone size corresponds to a third amount of memory cells of the first block of memory cells available to store the temporary data;

configuring the zone to increase or decrease by a quantity of memory cells from the first zone size to a second zone size in the first block of memory cells based at least in part on determining whether the second amount of memory cells satisfies the threshold, wherein the second zone size corresponds to a fourth amount of memory cells of the first block of memory cells, wherein the fourth amount of memory cells is less than or equal to the third amount of memory cells of the first block of memory cells associated with the available zone size;

executing the received command to remove the temporary data from at least the first block of memory cells based at least in part on configuring the zone to increase or decrease; and storing, based at least in part on executing the received command, second temporary data in the fourth amount of memory cells of the first block of memory cells.

\* \* \* \* \*